(12) United States Patent
Ejima (10) Patent No.: US 8,925,152 B2
(45) Date of Patent: Jan. 6, 2015

(54) FOLDING PORTABLE DEVICE, HINGE MECHANISM FOR THE DEVICE, AND METHOD OF OPENING THE DEVICE

(75) Inventor: Daisuke Ejima, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 61 days.

(21) Appl. No.: 13/057,848

(22) PCT Filed: Sep. 15, 2009

(86) PCT No.: PCT/JP2009/066577
§ 371 (c)(1),
(2), (4) Date: Feb. 7, 2011

(87) PCT Pub. No.: WO2010/035765
PCT Pub. Date: Apr. 1, 2010

(65) Prior Publication Data
US 2012/0013231 A1 Jan. 19, 2012

(30) Foreign Application Priority Data
Sep. 25, 2008 (JP) .................. 2008-245389

(51) Int. Cl.
*E05F 1/08* (2006.01)
*H04M 1/02* (2006.01)

(52) U.S. Cl.
CPC .......... *H04M 1/0216* (2013.01); *H04M 1/0227* (2013.01)
USPC .............................................. 16/307; 16/287

(58) Field of Classification Search
USPC ............ 16/307, 367, 282, 287, 283, 294, 302
See application file for complete search history.

(56) References Cited

U.S. PATENT DOCUMENTS

| 6,292,980 | B1 * | 9/2001 | Yi et al. ........................ | 16/303 |
| 7,150,075 | B2 * | 12/2006 | Kato ............................. | 16/367 |
| 2006/0238962 | A1 * | 10/2006 | Son et al. .................... | 361/679 |
| 2008/0078062 | A1 * | 4/2008 | Hsu et al. ..................... | 16/367 |
| 2008/0115325 | A1 * | 5/2008 | Chien .......................... | 16/367 |
| 2008/0168624 | A1 * | 7/2008 | Chien .......................... | 16/367 |
| 2009/0144938 | A1 * | 6/2009 | Wang et al. .................. | 16/367 |
| 2009/0265890 | A1 * | 10/2009 | Endo et al. ................... | 16/367 |
| 2010/0043175 | A1 * | 2/2010 | Wang et al. .................. | 16/343 |
| 2010/0299876 | A1 * | 12/2010 | Kang ............................ | 16/319 |

FOREIGN PATENT DOCUMENTS

| JP | 2006166241 A | 6/2006 |
| JP | 2008085865 A | 4/2008 |
| JP | 2008106803 A | 5/2008 |
| JP | 2008202690 A | 9/2008 |

OTHER PUBLICATIONS

International Search Report for PCT/JP2009/066577 mailed Nov. 2, 2009.

* cited by examiner

*Primary Examiner* — Victor Batson
*Assistant Examiner* — Matthew Sullivan
(74) *Attorney, Agent, or Firm* — Sughrue Mion, PLLC (57) ABSTRACT

A folding portable device in which a first case and a second case are foldably connected and which can be opened by a simple operation even when a thickness of the case is reduced includes support means for supporting the first case with respect to the second case in a relatively displaceable manner within a specified range and opening assistance means of which an open lock is unlocked when the first case is displaced more than a predetermined amount.

12 Claims, 12 Drawing Sheets

FOLDING PORTABLE DEVICE, HINGE MECHANISM FOR THE DEVICE, AND METHOD OF OPENING THE DEVICE

This application is the National Phase of PCT/JP2009/066577, filed Sep. 15, 2009, which is based upon and claims the benefit of priority from Japanese Patent Application No. 2008-245389, filed on Sep. 25, 2008, the disclosure of which is incorporated herein in their entirety by reference.

TECHNICAL FIELD

The present invention relates to a folding portable device and in particular, relates to a hinge mechanism used for the same and an opening method used for the same.

BACKGROUND ART

In recent years, thickness of a portable communication terminal has been reduced and whereby convenience of carrying the device has been greatly improved. On the other hand, especially, it becomes difficult for a user to perform an opening operation of the folding portable terminal with one hand. Therefore, various technologies which make the opening operation of the folding portable terminal easy are offered.

For example, in a portable device disclosed in Japanese Patent Application Laid-Open No. 2008-85865 (refer to FIG. 5 to FIG. 10 and paragraphs 0084 to 0105), in a closed state that a first case is folded over a second case, a protruding portion used for hooking a finger is formed by fluctuating one of the cases around a pivot shaft. And with that the opening operation is made easy.

DISCLOSURE OF THE INVENTION

The above-mentioned portable device disclosed in Japanese Patent Application Laid-Open No. 2008-85865 has a structure in which a pivot shaft is additionally provided to a hinge for opening and closing the first case and the second case and the case can be rotated in a fluctuation direction whereby the protruding portion for hooking a finger is formed. Therefore, after fluctuating one of the cases, the case has to be opened with fingers. Therefore, there is a problem in which a complicated finger operation is required until the case is completely opened.

The present invention is made to solve the above problem. The object of the present invention is to provide a folding portable device whose case can be opened by a simple operation, a hinge mechanism used for the same, and an opening method.

In order to achieve the object, a folding portable device according to the present invention is a folding portable device whose first case and second case are foldably connected to each other. The folding portable device is characterized by including support means for supporting the first case with respect to the second case in a relatively displaceable manner within a specified range and opening assistance means for unlocking an open lock when the first case is displaced more than a predetermined amount.

A hinge mechanism according to the present invention is a hinge mechanism which foldably connects a first case and a second case of a folding portable device. The hinge mechanism is characterized by including support means for supporting the first case with respect to the second case in a relatively displaceable manner within a specified range and opening assistance means for unlocking an open lock when the first case is displaced more than a predetermined amount.

An opening method according to the present invention is an opening method of a folding portable device whose first case and second case are foldably connected to each other for making the first case and the second case open. The opening method is characterized by including the steps of: relatively displacing the first case with respect to the second case within a specified range and unlocking an open lock of an opening assistance mechanism when the first case is displaced more than a predetermined amount.

The present invention has a structure mentioned above. Consequently, the case can be opened by a simple operation with one hand without being affected by reduction of a thickness of the folding portable device.

BEST MODE FOR CARRYING OUT THE INVENTION

1. Folding Portable Device

FIG. 1A to FIG. 1D are perspective views for explaining an example of an opening operation of a folding portable device according to one exemplary embodiment of the present invention. The folding portable device according to the exemplary embodiment includes a first case 10, a second case 11, and a hinge portion 12 for connecting these cases. A display section 10a is provided on an inside main surface of the first case 10 and an operation section 11a including a numeric keypad and the like is provided on the inside main surface of the second case 11.

Figure 1A:
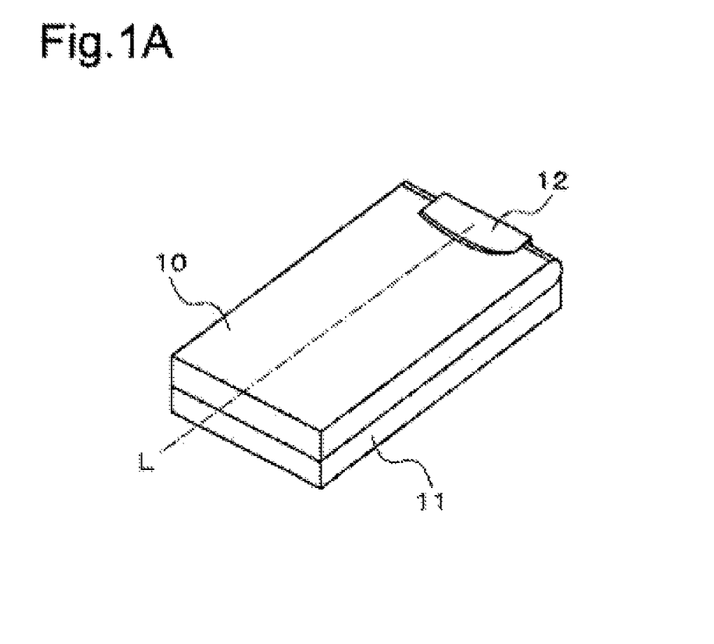
FIG. 1A to FIG. 1D are perspective views for explaining an example of an opening operation of a folding portable device according to one exemplary embodiment of the present invention.
Figure 1B:
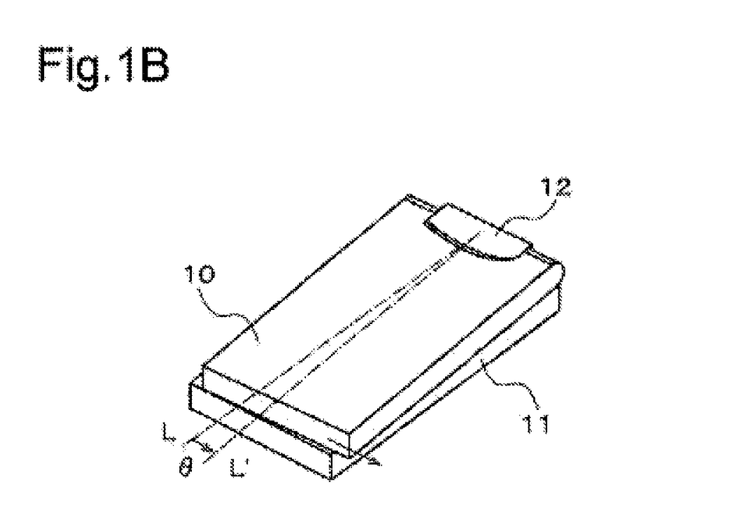
Figure 1C:
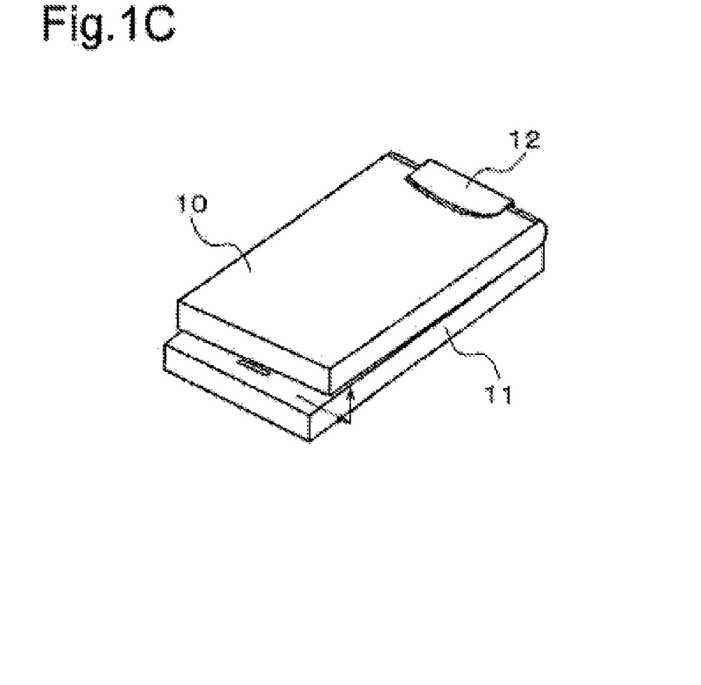
Figure 1D:
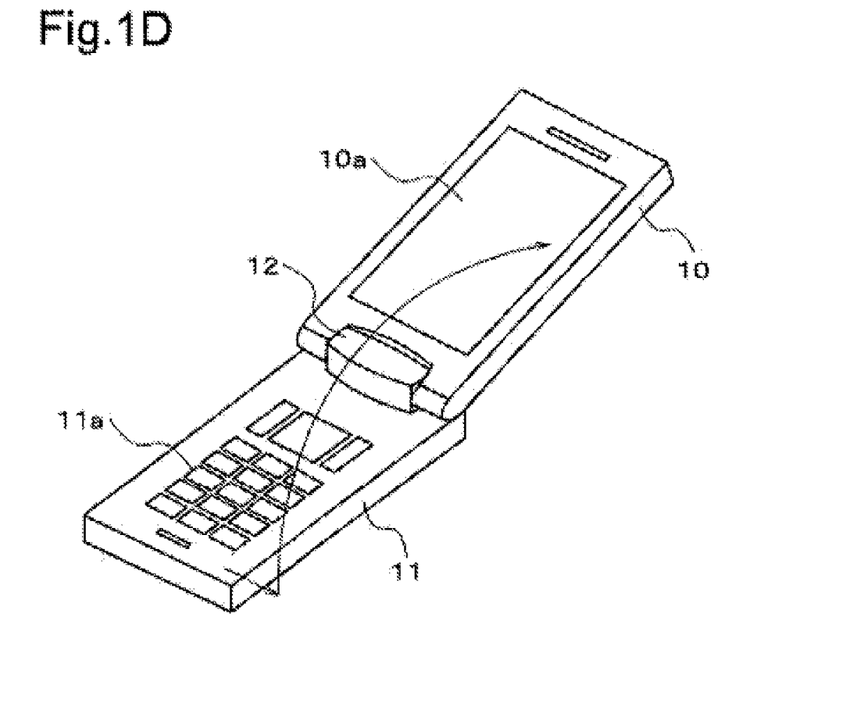

The hinge portion 12 is configured so that the first case 10 can be displaced (shifted) by only a predetermined displacement amount (here, angle θ) with respect to the second case 11 against a restoring force as mentioned later. When the first case 10 is rotated by only the angle θ in a counterclockwise direction (arrow direction) from a closed state shown in FIG. 1A as shown in FIG. 1B, an open lock (mechanism for engaging the first case 10 with the second case 11) in the hinge portion 12 is unlocked and the opening assistance mechanism is triggered. In other words, it is desirable that the angle θ is approximately equal to an amount of displacement with which the open lock is unlocked. In order to avoid the unintended unlocking of the open lock caused by the unintended displacement, it is desirable that the angle θ is approximately equal to 1 to 5 degrees of which a user can easily displace the case with one hand. By this, the first case 10 is opened by the opening assistance mechanism as shown in FIG. 1C and the folding portable device becomes in an open state as shown in FIG. 1D.

FIG. 2A to FIG. 2D are perspective views for explaining another example of an opening operation of a folding portable device according to one exemplary embodiment of the present invention. Further, the same reference number is used for a member having a function that is the same as that of the member shown in FIG. 1. A folding portable device shown in FIG. 2 includes the first case 10, the second case 12, and the hinge portion 12 for connecting these cases. A rotation direction of the first case 10 is different from that of the above-mentioned example.

Figure 2A:
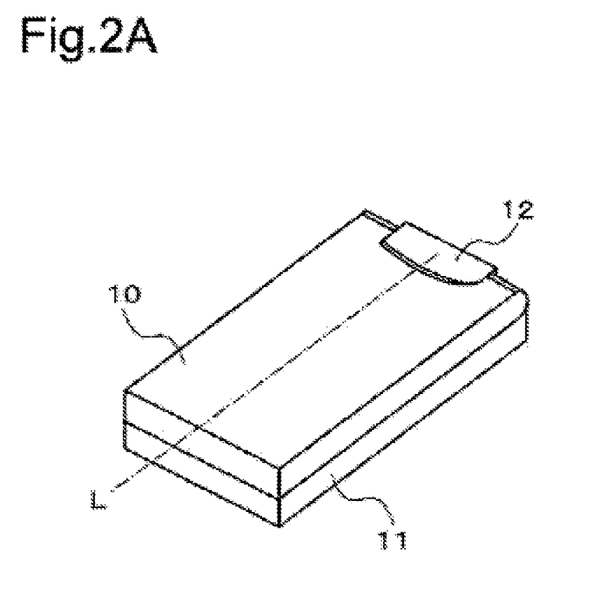
FIG. 2A to FIG. 2D are perspective views for explaining another example of an opening operation of a folding portable device according to one exemplary embodiment of the present invention.
Figure 2B:
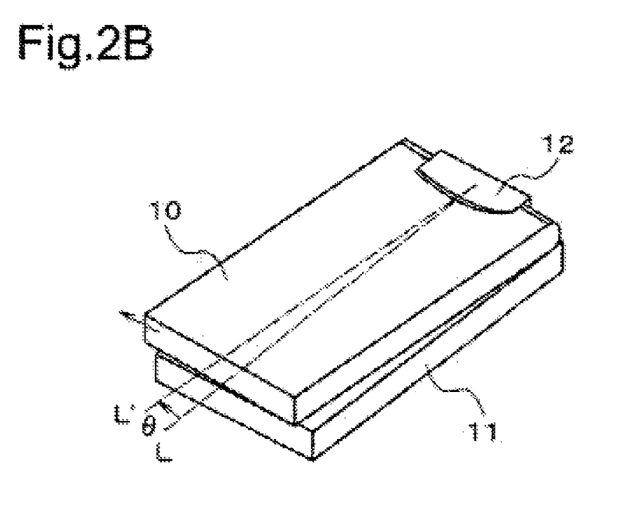
Figure 2C:
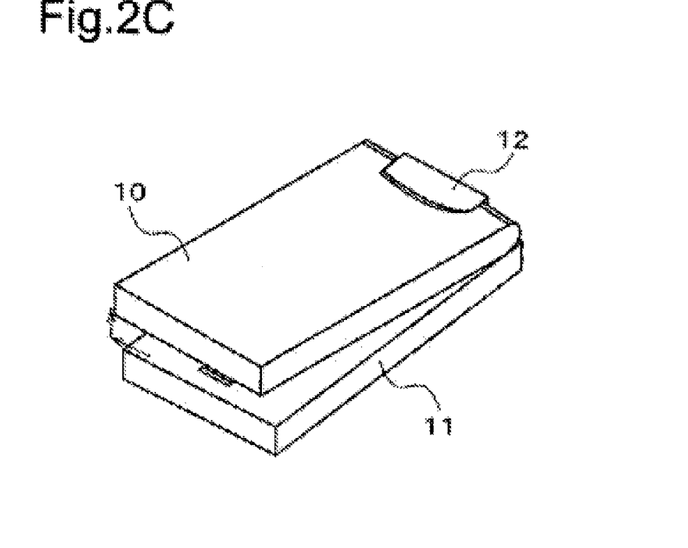
Figure 2D:
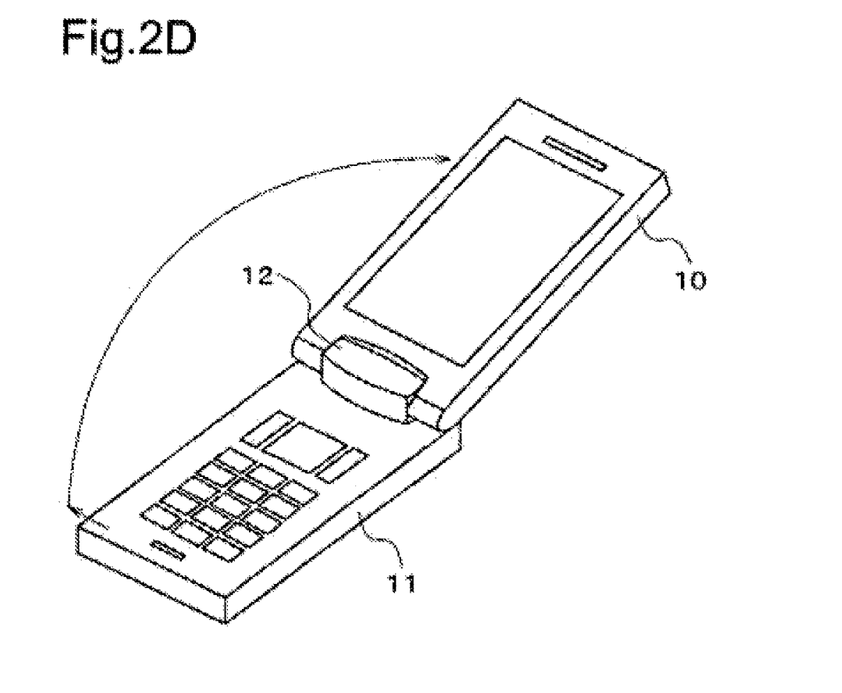

When the first case 10 is displaced by only the angle θ (for example, approximately 1 to 5 degrees) in a clockwise direction (arrow direction) from the closed state shown in FIG. 2A against the restoring force as shown in FIG. 2B, the open lock in the hinge portion 12 is unlocked and the opening assistance mechanism is triggered. By this, as shown in FIG. 2C, the first case 10 is opened by the opening assistance mechanism and the folding portable device becomes in the open state as shown in FIG. 2D.

Further, the folding portable device may have both the structure shown in FIG. 1 and the structure shown in FIG. 2 at the same time. In other words, a structure in which when the first case 10 is displaced by only the angle θ in either the counterclockwise direction or the clockwise direction, the open lock of the hinge portion 12 is unlocked and the opening assistance mechanism is triggered can be used.

A spring mechanism or a motor mechanism for urging the first case 10 in a direction in which the first case 10 is opened when the open lock in the hinge portion 12 is unlocked can be used for the opening assistance mechanism.

Figure 3A:
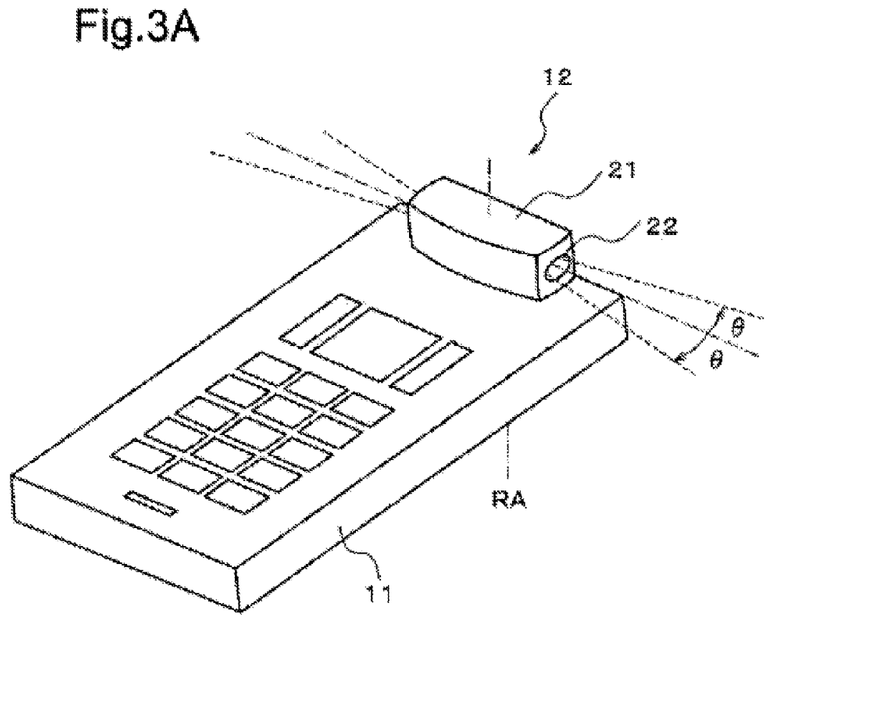
FIG. 3A is a perspective view of a second case, showing an outer appearance of a hinge portion 12 of a folding portable device according to the exemplary embodiment
Figure 3B:
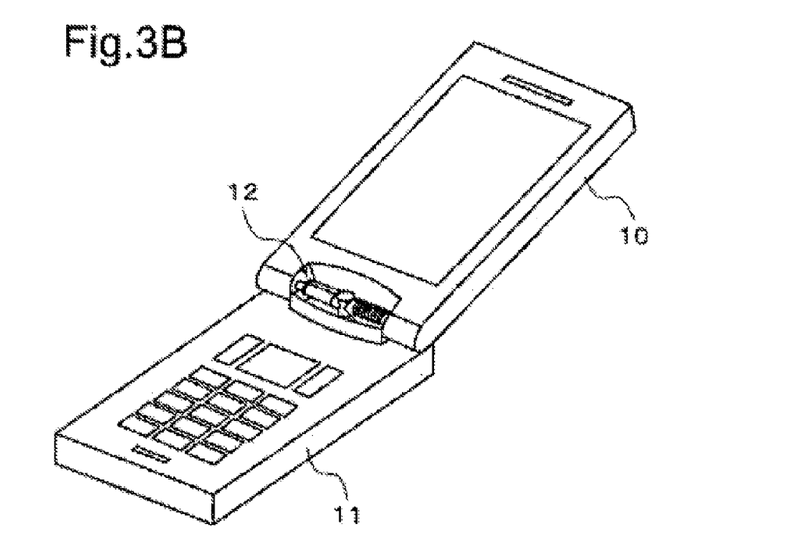
FIG. 3B is a perspective view of the folding portable device when the folding portable device is opened in which a part of a hinge cover of the hinge portion 12 is cutaway.

FIG. 3A is a perspective view of the second case, showing the outer appearance of the hinge portion 12 of the folding portable device according to the exemplary embodiment and FIG. 3B is a perspective view of the folding portable device in which a part of a hinge cover of the hinge portion 12 is cutaway when the folding portable device is opened. As shown in FIG. 3A, the hinge portion 12 has a structure in which a hinge mechanism mentioned later is included in a hinge cover 21 and the first case 10 is connected through laterally long hinge holes 22 provided at both ends of the hinge cover 21 so as to be able to open/close and displace by only the angle θ. A displacement angle θ may be restricted by the width of the hinge hole 22 or it may be restricted when the hinge mechanism mentioned later is brought into contact with the hinge cover 21. Additionally, restriction means such as a stopper or the like for restricting the displacement angle θ may be included in the hinge mechanism itself. Further, in the exemplary embodiment, an amount of displacement of the first case 10 with respect to the second case 11 is given by the rotation angle θ around a displacement axis RA.

2. Hinge Mechanism

Figure 4:
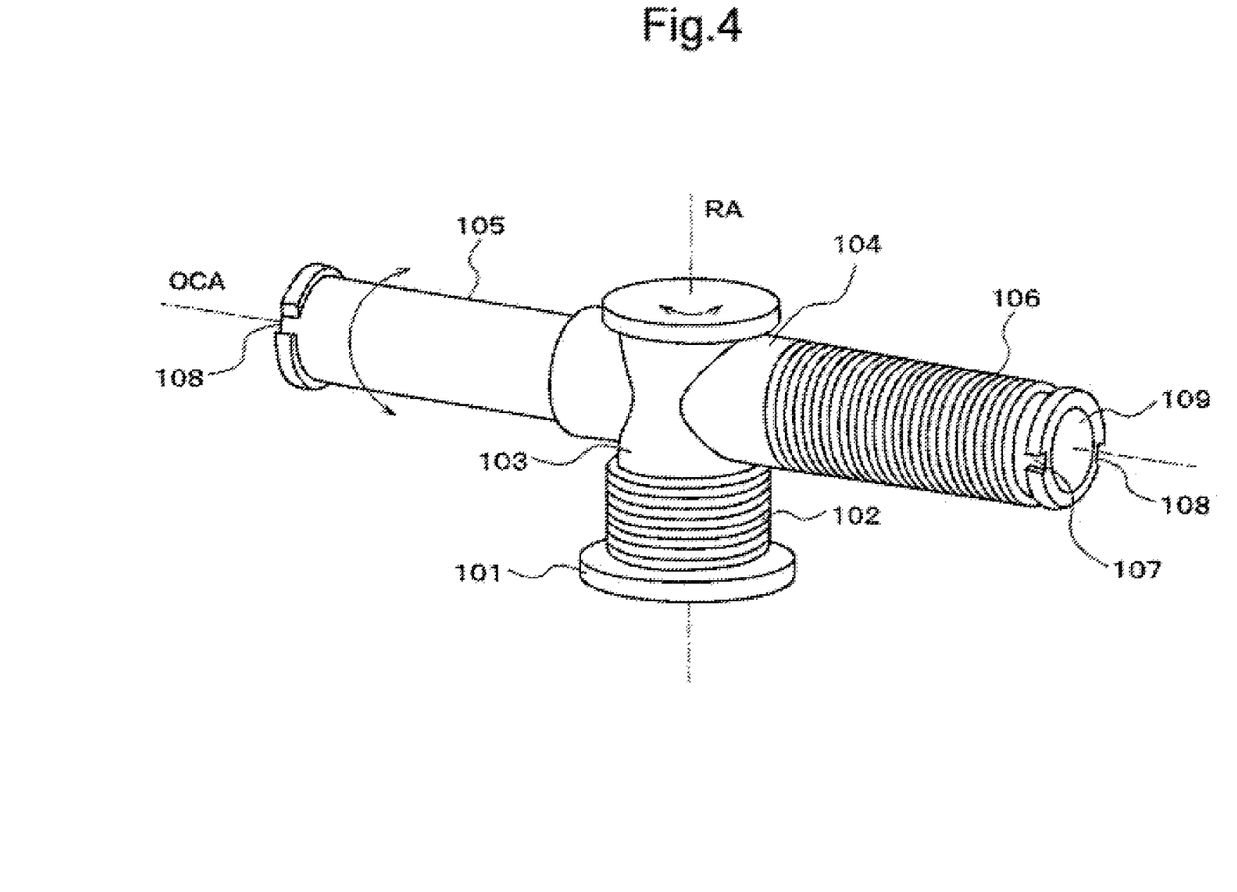
FIG. 4 is a perspective view showing an example of a hinge mechanism of a folding portable device according to the exemplary embodiment.

FIG. 4 is a perspective view showing an example of a hinge mechanism of a folding portable device according to the exemplary embodiment. In the exemplary embodiment, a support body extending in a direction of the displacement axis RA is configured so as to be rotatable by only the rotation angle θ against a restoring force of an elastic body and an opening/closing support body extending in a direction of an open/close axis OCA perpendicular to the displacement axis RA is provided to the support body so as to be rotatable.

The support body extending in a direction of the displacement axis RA has a structure in which a displacement shaft fixing portion 101, a displacement shaft spring 102, and a displacement shaft rotation portion 103 are connected in series. The displacement shaft fixing portion 101 is perpendicularly fixed to a main surface of the second case 11 and connected to the displacement shaft rotation portion 103 through the displacement shaft spring 102.

The displacement shaft spring 102 makes it possible for the displacement shaft rotation portion 103 to rotate about the displacement axis RA in a clockwise direction and a counterclockwise direction with respect to the displacement shaft fixing portion 101. When the displacement shaft rotation portion 103 is rotated, a biasing force is generated according to an amount of torsion of the displacement shaft spring 102 which returns the displacement shaft rotation portion 103 to an original position. Namely, the displacement shaft spring 102 is connected to the displacement shaft fixing portion 101 and the axis rotation portion 103 and whereby when the first case 10 is displaced, a force to return the first case 10 to the original position is generated. Further, when a magnet is arranged on the first case 10 and the second case 11 so that the magnet on the first case 10 and the magnet on the second case 11 face each other, rattling generated between the first case 10 and the second case 11 when the folding portable terminal is in the closed state can be prevented.

The opening/closing support body extending in a direction of the open/close axis OCA is composed of an opening/closing shaft fixing portion 104, an opening/closing shaft rotation portion 105, and an opening/closing shaft spring 106, and the opening/closing shaft fixing portion 104 is fixed to the displacement shaft rotation portion 103. An engaging recess 107 for the open lock used in a closed state and an engaging recess 108 for the locking used in an open state are formed on a circumferential portion at both ends of the opening/closing shaft rotation portion 105 in a predetermined arrangement. The both ends of the opening/closing shaft rotation portion 105 are fixed to one end of the first case 10 and the first case 10 is supported with respect to the second case 11 so as to be able to be freely opened and closed according to the rotation of the opening/closing shaft rotation portion 105.

The opening operation of the first case 10 is assisted by the opening/closing shaft spring 106. One end of the opening/closing shaft spring 106 is connected to the opening/closing shaft fixing portion 104 and the other end thereof is connected to the opening/closing shaft rotation portion 105. When the first case 10 and the second case 11 are closed, the opening/closing shaft spring 106 is in a twisted state and whereby a rotation shaft rotation portion 105 is urged in a direction in which the folding portable device is opened. As a result, as mentioned later, the opening operation of the first case 10 is assisted and an angle thereof is automatically arranged from the closed state to the open state.

Here, the engaging recess 107 for closed state is formed as a rectangular cutout on both rotation direction sides and the first case 10 and the second case 11 are stably locked to each other when the folding portable device is in the closed state. In contrast, the engaging recess 108 for open state is formed as a rectangular cutout on a direction side on which the first case 10 is opened and a sloped cutout on a direction side on which the first case 10 is closed. The function of the engaging recess 107 for closed state and the engaging recess 108 for open state will be described later.

The opening/closing shaft fixing portion 104 and the opening/closing shaft rotation portion 105 are cylindrical and a hollow section 109 thereof is used for a wiring between the first case 10 and the second case 11. Similarly, the displacement shaft fixing portion 101, the displacement shaft spring 102, and the displacement shaft rotation portion 103 are also cylindrical and the hollow sections of them (not shown) are also used for the wiring between the first case 10 and the second case 11.

Figure 5:
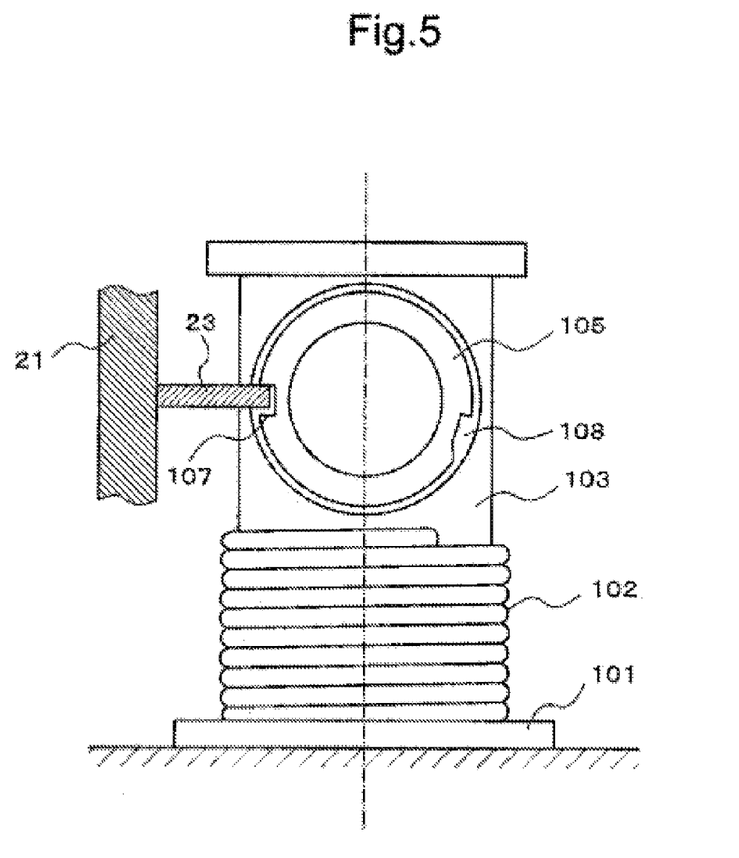
FIG. 5 is a side structure view of the hinge mechanism shown in FIG. 4 when viewed from an open/close axis OCA direction.

FIG. 5 is a side structure view of the hinge mechanism shown in FIG. 4 when viewed from the open/close axis OCA direction. The engaging recess 107 for closed state and the engaging recess 108 for open state that are provided at both ends of the opening/closing shaft rotation portion 105 can be engaged with an engaging projection portion 23 provided inside the hinge cover 21. FIG. 5 shows a state in which the engaging recess 107 for closed state is engaged with the engaging projection portion 23 when the first case 10 and the second case 11 are closed. The opening assistance mechanism in the exemplary embodiment will be described below.

3. Opening Assistance Mechanism

FIG. 6A to FIG. 6D are side structure views of the hinge mechanism, for explaining an opening assistance mechanism in a folding portable device according to the exemplary embodiment.

Figure 6A:
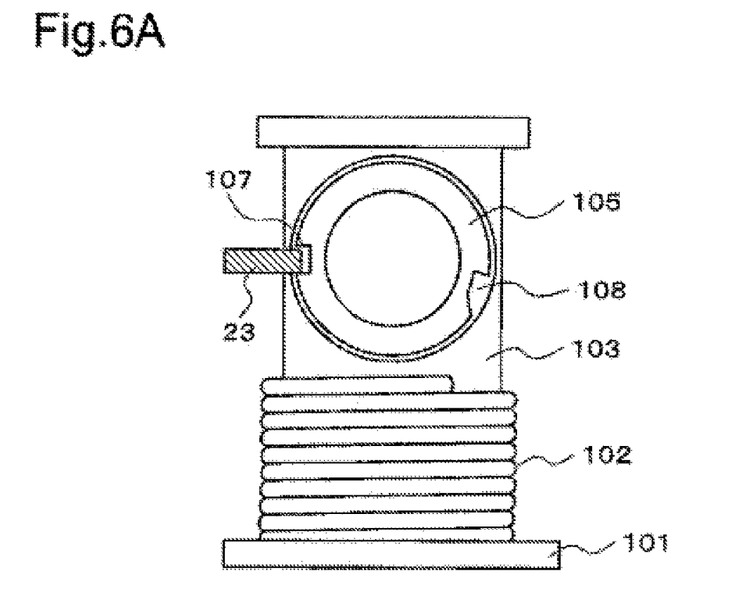
FIG. 6A to FIG. 6D are side structure views of a hinge mechanism, for explaining an opening assistance mechanism in a folding portable device according to the exemplary embodiment.

First, as shown in FIG. 6A, when the first case 10 and the second case 11 are closed, the open lock is locked by engaging the engaging recess 107 for closed state with the engaging projection portion 23. In this open lock state, as mentioned above, the opening/closing shaft rotation portion 105 is urged in a direction in which the folding portable device is opened by the restoring force of the opening/closing shaft spring 106.

Figure 6B:
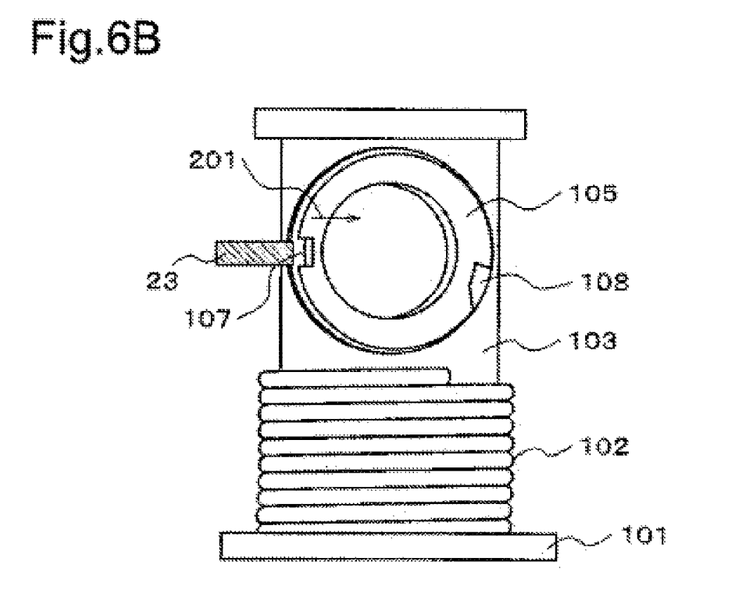

Next, as shown in FIG. 6B, when the folding portable device is in the closed state, the first case 10 is rotated to an arrow 201 around, the displacement axis RA by an angle greater than θ. At that time, the engaging recess 107 for closed state provided at both ends of the opening/closing shaft rotation portion 105 is separated from the engaging projection portion 23 and whereby the open lock is unlocked.

Figure 6C:
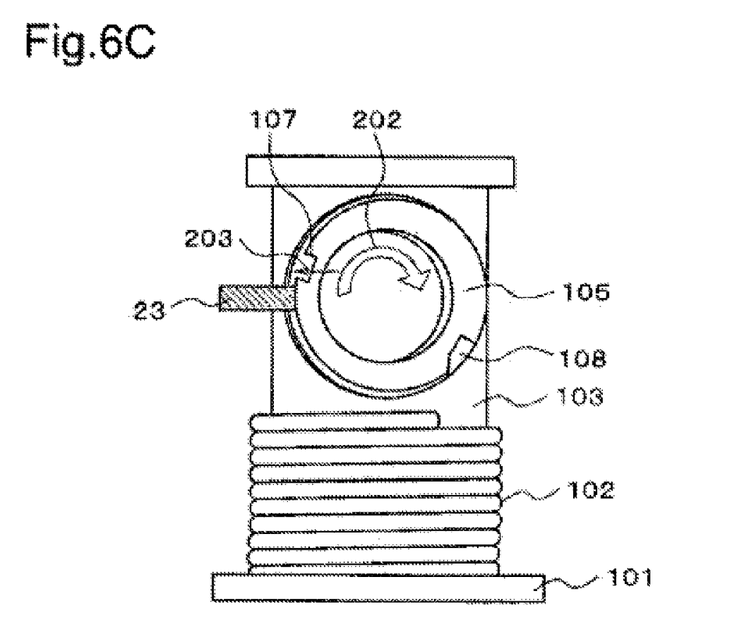

When the open lock is unlocked, as shown in FIG. 6C, the opening/closing shaft rotation portion 105 urged in a direction in which the folding portable device is opened by the opening/closing shaft spring 106 rotates in a direction of an arrow 202 and whereby the opening operation of the first case 10 is assisted. At that time, the opening/closing shaft rotation portion 105 is urged in a direction opposite to the arrow 201 (direction of an arrow 203) by the displacement shaft spring 102.

Figure 6D:
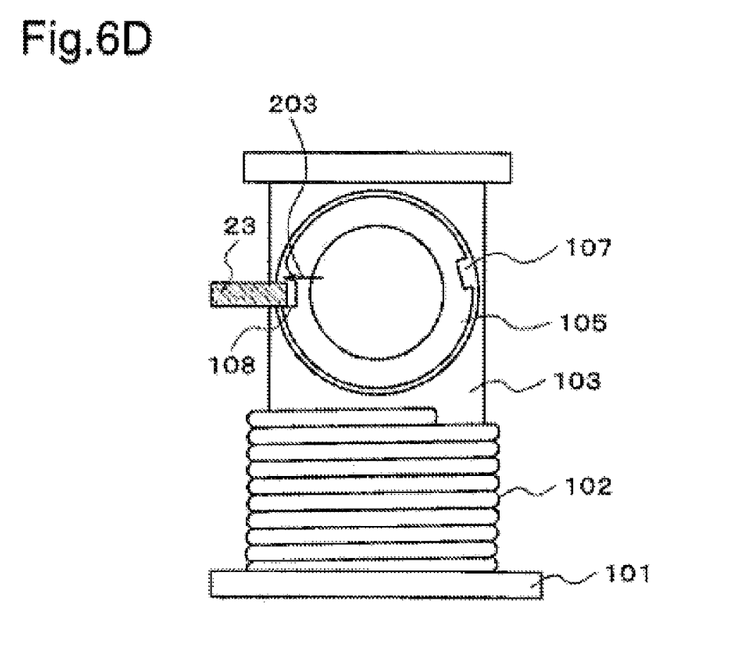

When the opening/closing shaft rotation portion 105 rotates in the direction of the arrow 202 and the engaging recess 108 for open state reaches the engaging projection portion 23, the opening/closing shaft rotation portion 105 is urged in the direction of the arrow 203 as shown in FIG. 6D. As a result, the engaging projection portion 23 falls in the engaging recess 108 for open state from a slope side thereof and stops when it is brought into contact with a side opposite to the slope side. Therefore the first case 10 is stably held at an open position. When the folding portable device is closed, the first case 10 is rotated in a direction opposite to the arrow 202 and whereby the engaging projection portion 23 is moved upward along the slope of the engaging recess 108 for open state and the opening/closing shaft rotation portion 105 is pushed to an arrow 201 side. Finally, as shown in FIG. 6A, the engaging recess 107 for closed state is engaged with the engaging projection portion 23 and the open lock is locked.

The folding portable device has such hinge mechanism and opening assistance mechanism. Therefore, as shown in FIG. 1B, by only rotating the first case 10 by only the angle θ in a counterclockwise direction from the closed state shown in FIG. 1A, the open lock is unlocked and the opening assistance mechanism is triggered. By this, as shown in FIG. 1C, the first case 10 is opened to an angle that is set in advance by the opening assistance mechanism. Accordingly, the first case 10 stably stops in the open state as shown in FIG. 1D.

Similarly, as shown in FIG. 2B, by rotating the first case 10 by only the angle θ in a clockwise direction from the closed state shown in FIG. 2A, the open lock is unlocked and the first case 10 is opened to an angle that is set in advance by the opening assistance mechanism. Accordingly, the first case 10 stably stops in the open state as shown in FIG. 2D.

4. Effect

In the folding portable device according to the exemplary embodiment, when the opening operation is performed with one hand, the opening assistance mechanism is triggered by only pushing a side surface of one of the cases by a finger so that the cases are displaced from each other. At that time, because only a force for holding a portable device is applied to an upper surface and a lower surface thereof, the friction between the first case 10 and the second case 11 due to the pressure is not large. It is possible to laterally displace one case with respect to the other while holding the longitudinal side surfaces of the case with fingers. Therefore, the opening operation can be performed with one hand without being affected by reduction of a thickness of the folding portable device.

Additionally, it is not necessary to arrange the pivot shaft for displacing the case that is employed in Japanese Patent Application Laid-Open No. 2008-85865. Further, it is not necessary to arrange a cantilever spring for stopping fluctuations of the case in a closed state or an open state. Accordingly, the hinge mechanism according to the exemplary embodiment can stably perform an opening/closing operation without employing a complicated structure.

5. Applications

When the first case 10 of the folding portable device according to the exemplary embodiment can be displaced in both a clockwise direction and a counterclockwise direction, the displacement direction can be functioned as a kind of an operation switch.

Figure 7A:
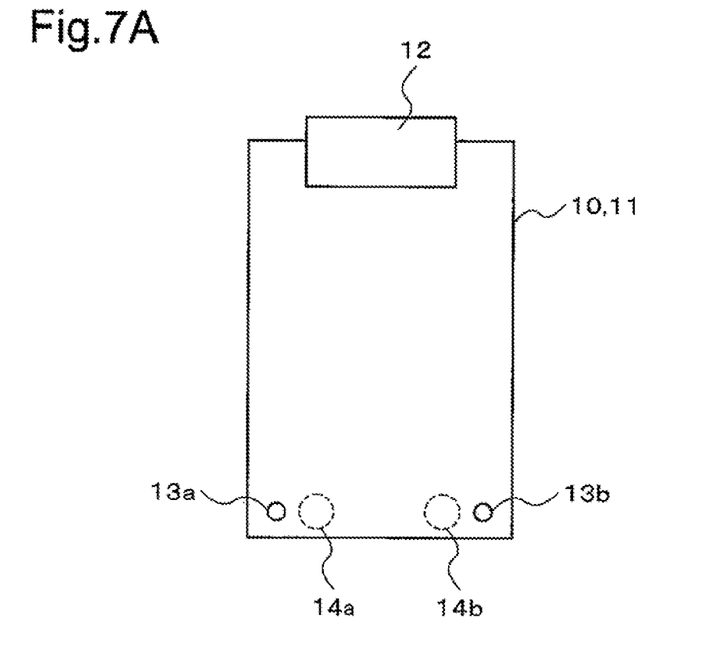
FIG. 7A to FIG. 7C are plan views for explaining an example of detecting a case displacement direction in a folding portable device according to the exemplary embodiment.
Figure 7B:
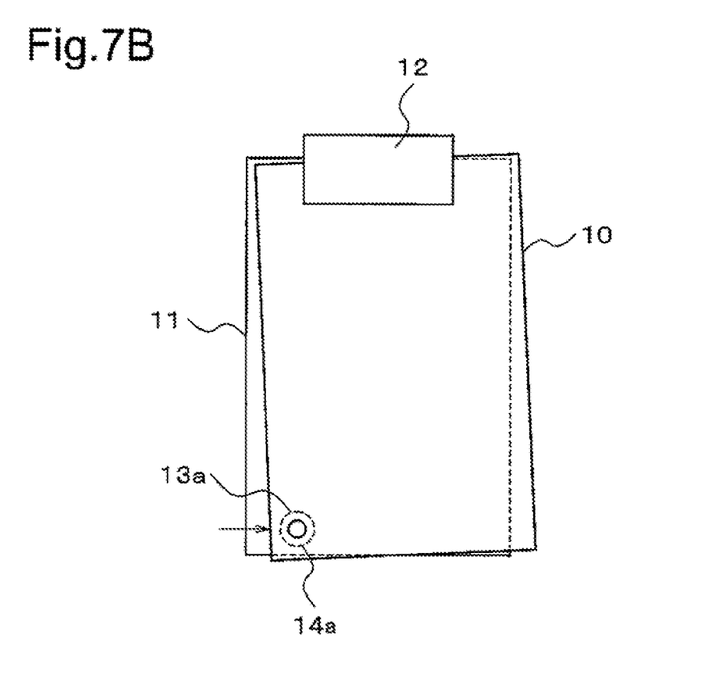
Figure 7C:
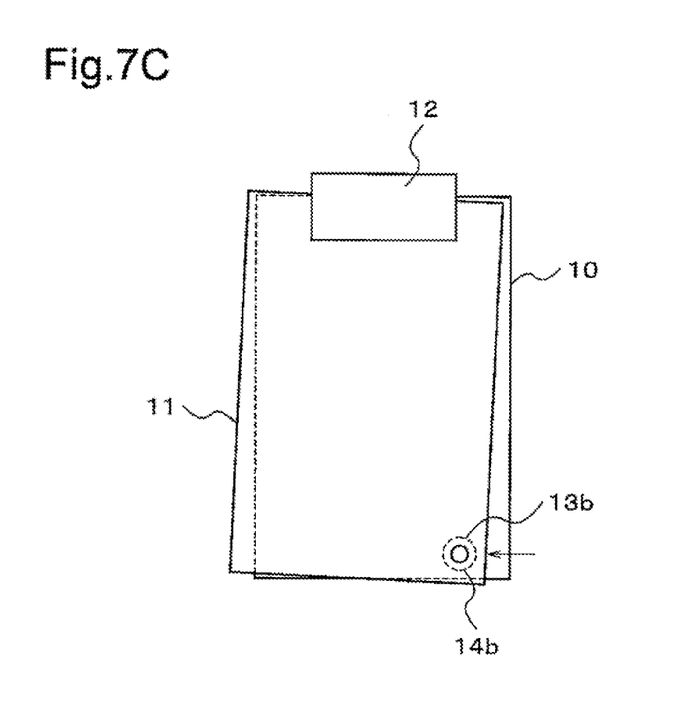

FIG. 7A to FIG. 7C are plan views for explaining an example of detecting a case displacement direction in a folding portable device according to the exemplary embodiment. Here, as shown in FIG. 7A, magnets 13a and 13b are provided on one of the first case 10 and the second case 11 and magnetic detectors 14a and 14b are provided on the other, whereby a direction of the case displacement can be detected. A Hall element can be used as the magnetic detector.

In this example, the magnet 13a is provided at the corner of the first case 10 and the magnetic detector 14a is provided at a position of the second case 11 whose rotation angle is equivalent to θ in a counterclockwise direction from the magnet 13a. Similarly, the magnet 13b is provided at the other corner of the first case 10 and the magnetic detector 14b is provided at a position of the second case 11 whose rotation angle is equivalent to θ in a clockwise direction from the magnet 13a.

As shown in FIG. 7B, when the first case 10 is displaced with respect to the second case 11 in a counterclockwise direction and opened, the magnetic detector 14*a* located at a position corresponding to the rotation angle θ detects the magnetism of the magnet 13*a* and the magnetic detector 14*b* does not detect the magnetism. Therefore, it is possible to detect that the first case 10 is displaced in the counterclockwise direction. On the contrary, as shown in FIG. 7C, when the first case 10 is displaced with respect to the second case 11 in a clockwise direction and opened, the magnetic detector 14*b* located at a position corresponding to the rotation angle θ detects the magnetism of the magnet 13*b* and the magnetic detector 14*a* does not detect the magnetism. Therefore, it is possible to detect that the first case 10 is displaced in the clockwise direction.

Thus, by detecting an initial displacement direction at the time of case opening operation, it is possible to control the operation of the folding portable device depending on the displacement direction. Hereinafter, a folding portable telephone device which can be switched between a usual portable phone mode and a television viewing mode for a one-segment television or the like will be described as an example.

Figure 8:
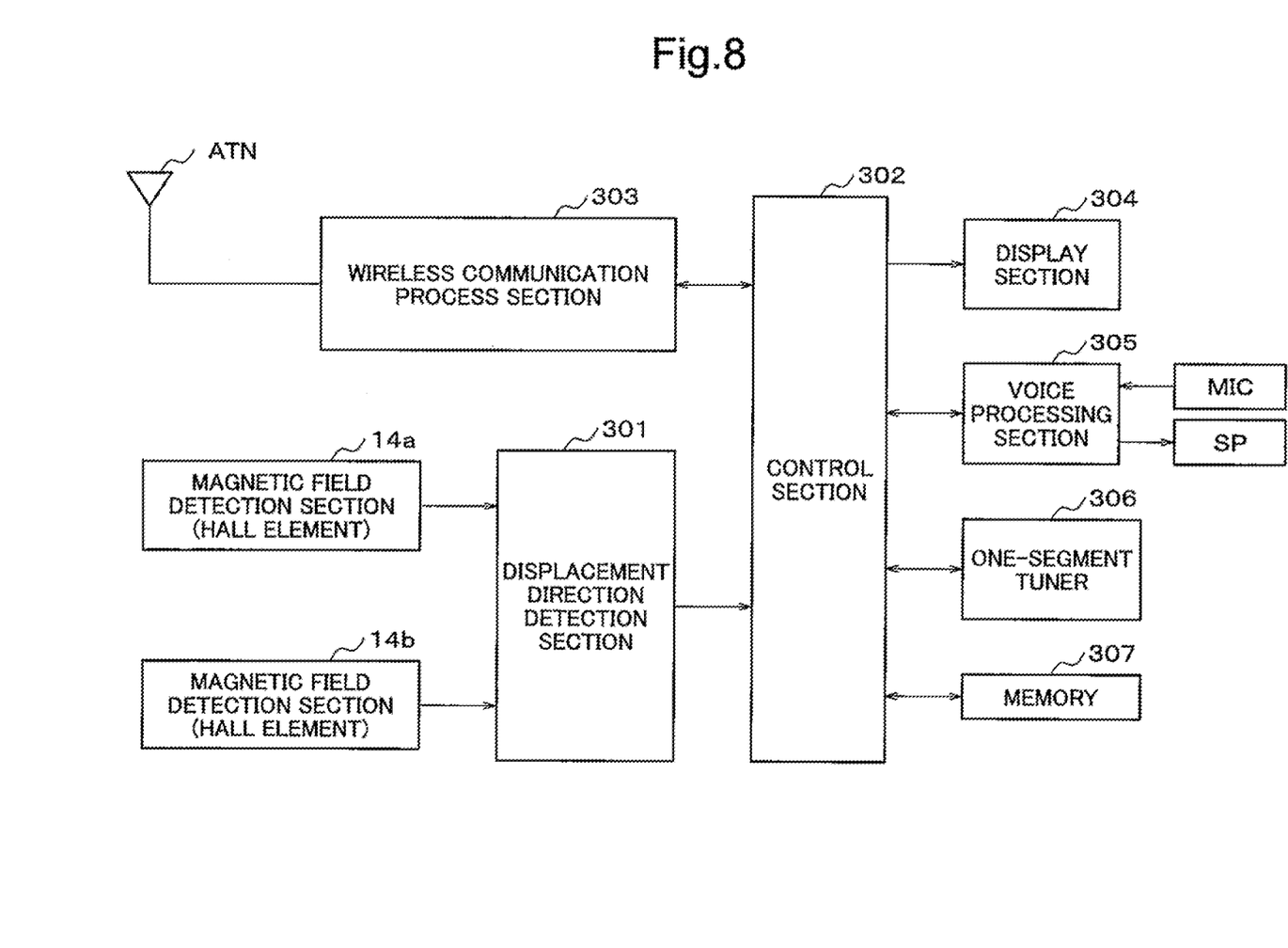
FIG. 8 is a block diagram schematically showing a circuit configuration of a folding portable telephone device according to one application of the present invention.

FIG. 8 is a block diagram schematically showing a circuit configuration of the folding portable telephone device according to one application of the present invention. A displacement direction detection section 301 detects the displacement direction by depending which of the magnetic detectors 14*a* and 14*b* detects the magnetism, and notifies a control section 302 of it.

The control section 302 controls a wireless communication process section 303 which has an antenna ATN and controls wireless communication with a base station, a display section 304 for displaying a video and other information, a voice processing section 305 to which a speaker SP or an earphones and a microphone MIC are connected, a television viewing tuner 306 for the one-segment television or the like, and a memory 307 for storing setting information, a program, and various data, and whereby various functions such as a portable phone function, a one-segment television or other television viewing function, or the like can be realized.

In an example shown in FIG. 8, when the first case 10 is displaced with respect to the second case 11 in the clockwise direction and opened, the displacement direction detection section 301 recognizes that the first case 10 is rotated in the clockwise direction. And the control section 302 activates software for a usual portable phone mode using the wireless communication process section 303. On the contrary, when the first case 10 is displaced with respect to the second case 11 in the counterclockwise direction and opened, a one-segment television or other television viewing function is set and the television viewing tuner 306 for the one-segment television or the like is activated.

As the other applications, the hinge mechanism shown in FIG. 4 can be applied to a hinge mechanism which has a two-axis hinge structure with which the first case 11 can be moved in an opening/closing direction and a rotation direction or a cycloid structure.

While the present invention has been described with reference to the exemplary embodiment, the present invention is not limited to the exemplary embodiment. With regard to the configuration and detail of the present invention, various modifications, which are apparent to a person skilled in the art, are possible within the scope of the present invention.

INDUSTRIAL APPLICABILITY

The present invention can be applied to a general folding portable device and can be used for, for example, a folding portable telephone, a portable communication terminal, or the like.

The invention claimed is:

1. A folding portable device comprising a first case and a second case foldably connected to each other by a hinge portion, the first case and the second case being rotatable relative to each other between a closed state and an open state, the hinge portion comprising:

a support body comprising a displacement shaft rotation portion, defining a displacement axis, that is rotatable around said displacement axis when the first case and the second case are rotated relative to tone another around said displacement axis;

an opening-closing support body defining an opening-closing axis that is orthogonal to the displacement axis and comprising an opening-closing shaft fixing portion and an opening-closing shaft rotation portion, wherein the opening-closing shaft fixing portion and the opening-closing shaft rotation portion are rotatable relative to each other around said opening-closing axis;

a closed state engaging recess formed on the opening-closing shaft rotation portion;

an open state engaging recess formed on the opening-closing shaft rotation portion;

an opening-closing shaft spring sleeved on said opening-closing shaft fixing portion, wherein one end of the opening-closing shaft spring is connected to the opening-closing shaft fixing portion and the other end of the opening-closing shaft rotation portion and further wherein the opening-closing shaft rotation portion is fixed to the first case; and an engaging projection portion formed on the first case wherein;

when the folding portable device is in the closed state the engaging projection portion is engaged with the closed state engaging recess and the opening-closing shaft spring is in a twisted state to provide a restoring force for rotating the opening-closing shaft rotation portion relative to the opening-closing shaft fixing portion and put the foldable portable device in the open state; and when the first case and the second case are rotated relative to one another around the displacement axis by a predetermined angle the engaging projection portion disengages from the closed state engaging recess, the opening-closing shaft spring is released from the twisted state and the opening-closing shaft rotation portion is rotated around the opening-closing axis relative to the opening-closing shaft fixing portion by said restoring force thereby rotating the first case and the second case relative to one another so that the foldable portable device is in the open state and the engaging projection portion is engaged with the open state engaging recess.

2. The folding portable device describe din claim 1, wherein the first case is horizontally rotatable relative to the second case.

3. The folding portable device described in claim 1, wherein the predetermined angle is within 1 to 5 degrees.

4. The folding portable device described in claim 1, wherein the first case is horizontally rotatable in both a clockwise direction and a counterclockwise direction relative to the second case.

5. The folding portable device described in claim 4, further comprising: a magnet and a magnetic detector that detects a direction of displacement of the first case relative to the second case, wherein an operation of the folding portable device is controlled as a result of the direction detected by the magnetic detector.

6. A hinge mechanism which foldably connects a first case and second case of a folding portable device, comprising:
- a support body comprising a displacement shaft rotation portion, defining a displacement axis, that is rotatable around said displacement axis when the first case and the second case are rotated relative to one another around said displacement axis;
- a closed state engaging recess formed on the opening-closing shaft rotation portion;
- an open state engaging recess formed on the opening-closing shaft rotation portion, wherein one end of the opening-closing shaft spring is connected to the opening-closing shaft fixing portion and the other end of the opening-closing shaft rotation portion and further wherein the opening-closing shaft rotation portion is fixed to the first case; and
- an engaging projection portion formed on the first case, wherein
- when the folding portable device is-in the closed state the engaging projection portion is engaged with the closed state engaging recess and the opening-closing shaft spring is in a twisted state to provide a restoring force for rotating the opening-closing shaft rotation portion relative to the opening-closing shaft fixing portion and put the foldable portable device in the open state, and
- when the first case and the second case are rotated relative to one another around the displacement axis by a predetermined angle the engaging projection portion disengages from the closed state engaging recess, the opening-closing shaft spring is released from the twisted state and the opening-closing shaft rotation portion is rotated around the opening-closing axis relative to the opening-closing rotation portion is rotated around the opening closing axis relative to the opening-closing shaft fixing portion by said restoring force thereby rotating the first case and the second case relative to one another so that the foldable portable device is in the open state and the engaging projection portion is engaged with the open state engaging recess.

7. The hinge mechanism described in claim 6,
Wherein the first case is horizontally rotatable relative to the second case.

8. The hinge mechanism described in claim 6, wherein the predetermined angle is within 1 to 5 degrees.

9. The hinge mechanism described in claim 6,
wherein the first case is horizontally rotatable in both a clockwise direction and a counterclockwise direction relative to the second case.

10. The hinge mechanism described in claim 9, further comprising: a magnet and a magnetic detector that detects a direction of displacement of the first case relative to the second case,
wherein an operation of the folding portable device is controlled as a result of the direction detected by the magnetic detector.

11. A folding portable device comprising the hinge mechanism described in claim 6.

12. A folding portable device comprising a first case and a second case foldably connected to each other by a hinge portion, the first case and the second case being rotatable relative to each other between a closed state and an open state, the hinge portion comprising;
- means comprising a displacement shaft rotation portion, defining a displacement axis, that is rotatable around said displacement axis when the first case and the second case are rotated relative to one another around said displacement axis:
- an opening-closing support body defining an opening-closing axis that is orthogonal to the displacement axis and comprising an opening-closing shaft fixing portion and an opening-closing shaft rotation portion are rotatable relative to each other around said opening-closing axis:
- a closed state engaging recess formed on the opening-closing shaft rotation portion; and
- an engaging projection portion formed on the first case, wherein
- the engaging portion is engaged within the first engaging recess when the folding portable device is in a closed state, and
- when the folding portable device is in the closed state the engaging projection portion is engaged with the closed state engaging recess and the opening-closing shaft spring is in a twisted state to provide a restoring force for rotating the opening-closing shaft rotation portion relative to the opening-closing shaft fixing portion and put the foldable portable device in the open state, and
- when the first case and the second case are rotated relative to one another around the displacement axis by a predetermined angle the engaging projection portion disengages from the closed state engaging recess, the opening-closing shaft spring is released from the twisted state and the opening-closing shaft rotation portion is rotated around the opening-closing axis relative to the opening-closing shaft fixing portion by said restoring force thereby rotating the first case and the second case relative to one another so that the foldable portable device is in the open state and the engaging projection portion is engaged with the open state engaging recess.

* * * * *